US009920206B2

(12) United States Patent
Benson

(10) Patent No.: US 9,920,206 B2
(45) Date of Patent: Mar. 20, 2018

(54) SOFT-FEEL COATINGS

(71) Applicant: The Sherwin-Williams Company, Clevleland, OH (US)

(72) Inventor: Heidi M. Benson, Strongsville, OH (US)

(73) Assignee: The Sherwin-Williams Company, Cleveland, OH (US)

(*) Notice: Subject to any disclaimer, the term of this patent is extended or adjusted under 35 U.S.C. 154(b) by 0 days.

(21) Appl. No.: 13/803,685

(22) Filed: Mar. 14, 2013

(65) Prior Publication Data
US 2014/0303303 A1 Oct. 9, 2014

(51) Int. Cl.
C09D 7/12 (2006.01)
C09D 5/08 (2006.01)
C09D 5/44 (2006.01)
C09D 7/00 (2018.01)
C09D 175/06 (2006.01)
C09D 5/00 (2006.01)

(52) U.S. Cl.
CPC ............ C09D 7/1216 (2013.01); C09D 5/00 (2013.01); C09D 5/084 (2013.01); C09D 5/4465 (2013.01); C09D 7/005 (2013.01); C09D 7/1291 (2013.01); C09D 175/06 (2013.01)

(58) Field of Classification Search
USPC ........................ 524/439, 449, 407, 413, 437
See application file for complete search history.

(56) References Cited

U.S. PATENT DOCUMENTS

| 3,372,047 | A | * | 3/1968 | Linton ...................... C09C 1/42 106/416 |
| 4,192,691 | A | * | 3/1980 | Armanini .............. C09C 1/0015 106/417 |
| 4,317,895 | A | * | 3/1982 | Guagliardo et al. .......... 524/500 |
| 4,456,486 | A | * | 6/1984 | Bernhard ...................... 106/417 |
| 5,112,403 | A | * | 5/1992 | Okura et al. .................. 106/418 |
| 5,133,805 | A | * | 7/1992 | Kurata ................... B82Y 30/00 106/456 |
| 5,401,348 | A | * | 3/1995 | Oguchi et al. ................ 156/247 |
| 6,228,926 | B1 | * | 5/2001 | Golumbic ..................... 524/489 |
| 2009/0258990 | A1 | * | 10/2009 | Seneker et al. ............... 524/521 |
| 2010/0092766 | A1 | * | 4/2010 | Stine et al. .................... 428/336 |
| 2010/0119858 | A1 | * | 5/2010 | Benkhoff et al. .......... 428/537.1 |
| 2011/0112229 | A1 | * | 5/2011 | Nagaoka et al. ............. 524/186 |

OTHER PUBLICATIONS

Bayhyrdol U 241 Data Sheet, Aug. 2009.*
Wheeler, Metallic Pigments in Polymers, Section 3.3.5 pp. 21-22, Feb. 1999.*
Handbook of Reference Data for Non Destructive Testing, Feb. 2002.*
ASM Handbook Oct. 2003.*
Berwick, The Cause of the Chemical Resistance of Stainless Steel, Journal of Applied Chemistry, 2(10), pp. 576-590, Oct. 2, 1952.*
Corrosion Definition, Hawley's Condensed Chemical Dictionary, Mar. 2007.*
Density of Stainless Steel from Handbook of Reference Data for Non-Destructive Testing, Feb. 2002.*

* cited by examiner

Primary Examiner — Christopher M Rodd
(74) Attorney, Agent, or Firm — Vivien Y. Tsang; Jim C. Scott; Daniel A. Sherwin

(57) ABSTRACT

Soft feel coating compositions, particularly for plastic substrates, having improved chemical resistance and methods of improving the chemical resistance of soft-feel coatings are provided.

7 Claims, No Drawings

SOFT-FEEL COATINGS

The present invention relates to soft-feel coatings for plastic substrates.

BACKGROUND OF THE INVENTION

The use of plastic has become ubiquitous in the manufacture of household products, toys, tools, entertainment devices, computer hardware, and automobile components. Plastic substrates are generally low cost, durable and light weight; however, plastic is susceptible to being damaged by sunlight and weathering, impacts, and exposure to chemicals, including common chemicals found in lotions and insect repellants. In recent decades, coatings have been developed for application to plastic substrates that are intended to protect the substrate and provide aesthetic value. More recently, coatings have been surfacing that not only protect the plastic surface but also impart a soft, grippy or rubbery feel to the otherwise hard plastic. These coatings have been generally branded with the term "soft-touch" or "soft feel" coatings.

Vehicle manufacturers, be they automotive, aerospace, or marine manufacturers have been one of the biggest consumers for soft-feel coatings apart from manufacturers of consumer goods and electronics. The automotive companies have developed very exacting, but increasingly demanding specifications for interior coatings. Automakers are continually looking for coatings that exhibit great appearance, excellent resistance properties, rapid cure, ease of application, lower cost and are environmentally friendly.

Soft touch coatings have been subject to increasingly demanding specifications as well. Particularly, soft-feel coatings are being challenged to have improved chemical resistance. The motivation driving this movement is evidence that many chemicals, including those found in lotions and insect repellants, can soften the coating, and will migrate through the coating and into the plastic, causing adhesion loss of the coating to the plastic substrate and, in some instances, damage to the underlying plastic substrate. One approach to resolving this has been a multi-coating system incorporating a primer for chemical resistance and a soft-feel top coat. However, this multi-coating approach is time consuming.

First-generation soft-feel coatings were largely solvent-borne polyurethanes based on blends of polyols and isocyanates. Environmental regulations and consumer preferences have caused coatings suppliers to develop more environmentally friendly technologies. Therefore, new generations of soft-feel coatings have shifted toward 2K waterborne chemistries, primarily, but not exclusively, utilizing polyurethane dispersions (PUDs). More recently, 1K soft-feel coatings have been under research.

Despite the efforts of formulators, it is still a challenge to provide soft-feel coatings that satisfy the more stringent standards for chemical resistance. To date, efforts at improving chemical resistance have primarily focused on improving or modifying the resin system. A typical waterborne soft touch formulation comprises a water dispersible polyol resin, often a polyurethane polyol dispersion and a water-dispersible isocyanate. The compositions may include other non-functional resin dispersions. Thus, some improvement in chemical resistance may be anticipated from a observant selection of polyols and other resin blends based on resin characteristics, morphologies and properties, like glass transition temperature (Tg), molecular weight or shape, all selected with any eye toward balancing flexibility, softness and resistance to chemicals. Exemplary of "resin-centric" approaches to improving chemical resistance in soft-touch coatings, are the efforts described in U.S. Pat. No. 8,313,837, which generally describe polyurethane soft touch coatings comprising one or more aqueous hydroxyl functional polyurethane dispersions and a polyisocyanate. Aqueous non-hydroxyl functional polyurethane dispersions are taught as useful contributions to the coatings. Another water-borne polyurethane soft touch coating is described in WO/2012/089827, which describes a polyurethane soft touch coating comprising the reaction product of a) a non-hydrolysable polyol binder, such as a polycarbonate or polyether polyol or polyester polyols having sterically hindered ester linkages, which are protected from hydrolysis, and b) and organic polyisocyanate.

Despite numerous research efforts directed at improving chemical resistance through modification of the resin system, there is still a need to improve the chemical resistance of the current generations of soft-touch coatings. The present invention is based on the surprising discovery that certain pigments can be employed in wide variety of soft-touch coatings resulting in coatings that have substantially improved chemical resistance, particularly against lotions and insect repellents, and yet, retain their soft touch feel.

BRIEF DESCRIPTION OF THE INVENTION

Generally pigments are included in coating formulations to impart color or alter rheology in a particular manner. Many of the conventional pigments are amorphously or bead shaped and afford trivial hindrance to chemicals passing through the coating. A higher pigment load may offer greater nominal defense, but with potentially negative consequences to the overall feel of the coating due to the presence of the hard particles dispersed throughout the coating. Apart from the amorphous pigments, many of the flake pigments also fail to impart sufficiently improved chemical resistance in soft-feel coatings, particularly as against chemicals in lotions and insect repellents, and so, do not pass current, stringent specifications. In some instances, the pigments may themselves be pervious to chemical agents. Additionally, even if they provide an improvement in chemical resistance, flake pigments can have an exceptionally negative impact on the feel of the coating. Some flake pigments are susceptible to congregating at the surface of the coating or, by improper orientation in the film, interrupt the surface of the coating, giving it a hard and/or rough texture. Soft feel coatings that incorporate flattening agents along, to reduce gloss, and/or other bead or amorphous shaped pigment particles, when combined with flake pigments show susceptibility to poor chemical resistance and "feel". Without being bound by theory, it is believed that the amorphously shaped flattening particles in the coating can interfere with the desired horizontal orientation of the barrier pigments in the dry film, diminishing the effectiveness of the pigments to resist chemicals and potentially causing the pigments to interfere with the coating surface.

In view of this it is surprising to discover that the incorporation of platelet shaped stainless steel pigments or fluorophlogopite pigments or calcined mica pigments in a soft feel coating composition, including soft feel coating compositions that incorporate flattening agents or other amorphous particles, improves the chemical resistance of the coating and at pigment loads that do not substantially negatively impact the desirable soft feel of the dried film.

Again, without being bound by theory, it is theorized that these pigments have a sufficiently higher density relative to the wet coating resin matrix composition, are sufficiently chemically inert with respect to the coating compositions and are sufficiently impermeable, to allow the preferred pigments loaded in the range from about 5 to about 25% volume solids, to properly orient in the lower portion of the film layer, near the substrate, thereby improving chemical resistance, and sufficiently away from the upper surface of the coating so as not to inhibit the feel of the coating. This benefit may be seen both in flattened and non-flattened, pigmented and clear systems.

Platelet shaped stainless steel flake pigments are particularly useful in producing metallic looking soft-feel coatings. Platelet shaped fluorophlogopite and calcined mica pigments are particularly useful in producing clear or pigmented soft-feel coatings.

In one embodiment, the present invention is directed to a method for improving the chemical resistance of a soft-feel coating composition that comprises incorporating into the soft-feel coating composition a barrier pigment, selected from the group consisting of platelet shaped (flake) stainless steel pigments, fluorophlogopite, and calcined mica pigments.

The present invention is also directed to soft-feel coating compositions comprising a barrier pigment, selected from the group consisting of stainless steel flake pigments, fluorophlogopite, and calcined mica pigments.

The present invention is also directed to articles of manufacture comprising a plastic substrate to which at least a portion has been coated with a soft-feel coating of the present invention.

The term "article of manufacture" is used in its broadest sense, and can include virtually any article comprising a plastic substrate and the soft feel coating according to the present invention. "Plastics" can include, for example, polycarbonate, acrylonitrile butadiene styrene polymer blends ("ABS"), thermoplastic polyolefins, polypropylene, magnesium, and/or mixtures thereof; "plastics" can be filled or unfilled. The coating used according to the present invention is one that imparts a "soft feel" to the substrate. The term "soft feel" will be understood as giving a velvet-like or leather-like feel to an otherwise hard substrate.

In some embodiments, the preferred flake pigments may be employed in the soft-feel coating composition in a range of about 5 to about 25% volume solids, an in another embodiment, about 5 to about 10% volume solids, and in still another embodiment about 8 to about 15% volume solids and in another embodiment, about 10 to about 15% volume solids and in still another embodiment, about 12 to about 15% volume solids.

In one embodiment, the soft-feel coating composition may be a solvent-borne soft-feel composition. More particularly, the solvent borne soft-feel coating composition may comprise a polyol resin, a suitable crosslinker for the polyol resin, a carrier solvent, and a pigment selected from the group consisting of platelet shaped (flake) stainless steel pigments, fluorophlogopite, and calcined mica pigments. In some embodiments, the solvent-borne composition may include a flattening agent. In an alternative embodiment, the barrier pigment may be used as a flattening agent.

In an alternative embodiment, the soft-feel coating composition may be a water-borne composition. More particularly, the water borne soft-feel coating composition may comprise an aqueous resin dispersion or water dispersible polyol, a suitable crosslinker for the resin dispersion, and a pigment selected from the group consisting of platelet shaped (flake) stainless steel pigments, fluorophlogopite, and calcined mica pigments. In some embodiments, the water-borne composition may include a flattening agent. In an alternative embodiment, the barrier pigment may be used as a flattening agent. In still another embodiment, the soft-feel coating may be a clear coating, comprising a pigment selected from the group consisting of platelet shaped (flake) stainless steel pigments, fluorophlogopite, and calcined mica pigments The soft-feel coating composition may be a 2K system. In another embodiment, the soft-feel coating may be a 1K system, such as, but not limited to, a UV curable system.

According to one embodiment, a coating composition may comprise:
  a) a polyol resin;
  b) a polyisocyanate;
  c) at least one solvent;
  d) optionally, a flattening agent, and
  e) a platelet shaped pigment selected from the group consisting of stainless steel pigments, fluorophlogopite pigments, calcined mica pigments, and blends thereof,
wherein the polyol resin and polyisocyanate are selected to form, as a reaction product, a film forming polymer for a soft feel coating.

According to another embodiment, a coating composition may comprise:
  a) a resin composition, wherein the resin composition is a film forming resin composition selected to form a soft feel film;
  b) at least one solvent; and
  c) a platelet shaped pigment selected from the group consisting of stainless steel pigments, fluorophlogopite pigments, calcined mica pigments, and blends thereof.

The resin composition may comprise a UV curable resin, a self-crosslinking resin, or the combination of a crosslinkable resin and a suitable crosslinker.

DETAILED DESCRIPTION OF THE INVENTION

Numerous coating compositions that are self-described to provide "soft feel" of soft touch" coatings are described in the literature. Exemplary self-described soft-feel coatings include those taught in U.S. Pat. No. 8,313,837 and WO/2012/089827, which are incorporated herein by reference in relation to the soft-feel coating compositions, polyol resins, resin blends and isocyanates described therein. Binders and dispersions described for soft-feel coatings have been illustrated in U.S. Pat. Nos. 6,211,286 and 6,414,079 and 7,396,875, each of which is incorporated herein by reference for its teaching of soft-feel coating binders and compositions. Generally, 2K soft feel coating compositions comprise the reaction product of a polyol and an isocyanate and are thus, polyurethane coatings. 1K coatings are possible, including UV curable soft-feel coatings systems incorporating one or more UV curable resins. In solvent-borne compositions, the solvent comprises one or a blend of organic solvents, selected from the well known list of organic solvents, including ketone solvents, ester solvents, alcohols, glycol ether solvents, and glycol ether ester solvents. Exemplary, non-limiting examples of solvents that may be useful include xylene, n-butyl acetate, t-butylacetate n-butyl propionate, naptha, ethyl 3-ethoxypropionate, toluene, methyl ethyl ketone (MEK), acetone, methyl propyl ketone (MPK), methyl-n-amyl ketone (MAK), propylene glycol methylether acetate (PMA) and the like. In water-borne compositions water is typically the primary carrier and the polyols are generally water dispersible or provided as aqueous dispersions. Minor portions of suitable organic solvents may be employed.

Suitable polyols may include polyester polyols, polyether polyols, polycarbonate polyols, polycarbonate polyester polyols, polyacrylic polyols, polyurethane polyols, polycaprolactone polyols, polyolefin polyols, and blends thereof. Non-hydroxyl functional resins may be employed, such as non-hydroxyl functional polyurethane resins.

In one particularly useful embodiment, the resin comprises a linear polyester polyol, which may be used alone or in blends with other polyols.

It is noted that the term "soft-feel" conventionally relates to the feel of the dried coating. The desired soft-feel of the coating is obtained by selection of resins and crosslinkers to provide a coating having the desired feel. It is believed that the soft feel derives, in part from the glass transition temperature (Tg) of the resin matrix in the cured film, and may be affected by the crosslinking density in the resin matrix. Soft feel coatings may have a resin matrix Tg (dried film) in the range of −80° C. to −20° C.

For a 2K system, a polyisocyanate crosslinker may be utilized in combination with the polyol resin. Suitable polyisocyanates may be selected from isocyanate-functional materials that are well known in the art and include di-, tri- and multi-functional isocyanates as well as polyisocyanates that utilize di-, tri-, and multi-functional isocyanate material.

Suitable isocyanate functional materials include but are not limited to aromatic, cycloaliphatic and aliphatic polyisocyanates such as, 1,3 and 1,4 phenylene diisocyanate, 4-chloro-1,3-phenylene diisocyanate, toluene-2,4- or 2,6-diisocyanate, 1,2,4-benzene triisocyanate, 1,5- and 1,4-naphthalene diisocyanate, 2,4' and 4,4' diphenylmethane diisocyanate, 3,3'-dimethyl-4,4'-diphenylene diisocyanate, triphenylmethane triisocyanate, polymethylene polyphenyl isocyanate, 1,6 hexamethylene diisocyanate (HDI), isophorone diisocyanate, 4,4-dicyclohexylmethane diisocyanate, 2,2,4(2,4,4)-trimethyl-1,6-hexamethylene diisocyanate, trimethylhexamethylene diisocyanate, 1,4-diisocyanato pentane, isocyanatomethylcyclohexyl isocyanate, 1,6,11-undecane triisocynate, p- and m-tetramethylxylene diisocynate, 1,4-tetramethylene diisocyanate, 1,10-decamethylene diisocyanate, m-xylene diisocyanate, 1,3-bis(isocyanatemethyl)cyclohexane, and mixtures thereof.

It has been found that aliphatic polyisocyanates are particularly useful in accordance with this invention. In one embodiment, the curing agent may comprise HDI alone or in combination with another polyisocyanate.

Generally, a curing agent will be used in an amount sufficient to crosslink with at least a portion of the hydroxyl groups on the polyester(s) or other hydroxyl functional resins, when present, in the resin system. The relative amounts of the polyester(s) and other resins compared to a curing agent isocyanate may be expressed by the mole ratio of the reactive isocyanate groups to reactive hydroxyl groups. The isocyanate may be present in ratio of about 0.75:1 to about 1.5:1 based on the NCO:OH ratio. In one useful embodiment, the isocyanate is present in a ratio of about 0.8:1 to about 1.2:1 based on the NCO:OH ratio. In another useful embodiment, the isocyanate is present in a ratio of about 1:1 to about 1.1:1 based on the NCO:OH ratio.

The compositions taught herein may include an amount of one or more catalysts that catalyze the isocyanate hydroxyl reaction. Useful catalysts may include tertiary amines, such as triethylene diamine, N-methyl morpholine, N-ethyl morpholine, diethyl ethanolamine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propylamine, N,N-dimethyl benzyl amine, dicyclohexylmethylamine, 2,4,6-tris dimethylaminomethylphenol, N,N-dimethyl cyclohexylamine, triethylamine, tri-n-butylamine, 1,8-diaza-bichloro[5,40]-undecene-7 N-methyl diethanolamine, N,N-dimethyl ethanolamine, N,N-diethyl cyclohexylamine, N,N,N'N'-tetramethyl-ethylene diamine, 1,4-diaza-bicyclo-[2,2,2]-octane N-methyl-N-dimethylaminoethyl-piperazine, bis-(N,N-diethylaminoethyl)-adipate, N,N-diethylbenzylamine, pentamethyldiethylene triamine, N,N,N',N'-tetramethyl-1,3-butanediamine, 1,2-dimethylimidazole, 2-methylimidazole; tin compounds, such as stannous chloride, dibutyl tin di-2-ethyl hexoate, stannous octoate, dibutyl tin dilaurate, trimethyl tin hydroxide, dimethyl tin dichloride, dibutyl tin diacetate, dibutyl tin oxide, tributyl tin acetate, tetramethyl tin, dimethyl dioctyl tin, tin ethyl hexoate, tin laurate, dibutyl tin maleate, dioctyl tin diacetate; other metal organics, such as zinc octoate, phenyl mercuric propionate, lead octoate, lead naphthenate, and copper naphthenate.

Particularly useful, for the present invention, is dibutyl tin dilaurate (DBTDL). Useful amounts of catalyst will be about 0.01 to 5%, based on the total weight of the resin solids.

Additional additives that may be included in the composition described herein include UV inhibitors, wetting agents, flow agents, defoamers, flattening agents, plasticizers, silicone fluids, and the like.

In some useful embodiments, the coating compositions described herein may include a flattening agent. Flattening agents are generally small solid particles of material that are insoluble in water and are effective to reduce gloss. Preferably, the flattening agent particles have a size of from about 0.05 to about 10 microns, but may be present in clumps or agglomerates of up to about 50 microns. The flattening agent particles may be inorganic or organic. Examples of suitable inorganic flattening agents include silicates, such as talc, and various forms of silica, such as amorphous, aerogel, diatomaceous, hydrogel and fumed silicas. Examples of suitable organic flattening agents include insoluble urea-formaldehyde resins, polyethylene, polypropylene, cellulosic fibers and polyurethane/polyurea copolymers.

The amount of flattening agent in the first embodiment of the coating composition, on a solids basis, is preferably from about 1 to about 20 weight percent, more preferably from about 1 to about 10, still more preferably, about 1 to about 5 weight percent, still more preferably about 2 to about 5 weight percent based on the total weight of solids of the coating composition. In other embodiments, the flattening agent may comprise about 10 to about 20 weight percent.

The compositions of the present invention, be they waterborne or solvent-bore, 2K or 1K, comprise a platelet shaped pigment. "Platelet shaped" is intended to refer to pigments having a flattened, as opposed to round or particulate type profile and includes pigments described as flake pigments, sand dollar shaped pigments and lamellar pigments. The preferred platelet shaped pigments in accordance with the invention, have an average particle size (diameter) in the range of about 10 to about 40 microns, more usefully, about 15 to about 30 microns, and in some embodiments, most usefully around 20 to 30 microns. Blends of different sized platelet shaped pigments of the same or different materials and/or size may be employed in embodiments of the present invention. Platelet shaped pigments having a density of 15 to 30 lbs/gallon may be useful. In some embodiments, it is particularly useful it the platelet shaped pigments are at least 50% (1.5 times) to 400% (5.0 times) greater than the density of the resin matrix, and in other embodiments, at least 150% (2.5 times) to 400% greater density, and in still another embodiment, at least 100% greater density, and in another embodiment at least 200% (3.0 times) greater density than the resin matrix are useful in some embodiments. Though platelet pigment loading may vary from system to system, levels in the range of 5 to about 25% volume solids, an in another embodiment, about 5 to about 10% volume solids, and in still another embodiment about 8 to about 15% volume solids and in another embodiment, about 10 to about 15% volume solids and in still another embodiment, about 12 to about 15% volume solids are particularly useful levels for chemical resistance.

Though a variety of platelet shaped pigments are known, pigments selected from the group consisting of stainless steel flake pigments, fluorophlogopite pigments and calcined mica pigments are particularly preferred. Stainless steel flake pigments impart a silver or metallic hue to the coatings and are particularly useful in preparing soft feel metallic looking coatings. Fluorophlogopite flake and calcined mica pigments are particularly preferred in preparing pigmented or clear soft feel coatings.

The coatings of the present invention may include, in addition to a platelet shaped pigments selected from the group consisting of stainless steel flake pigments, fluorophlogopite pigments, calcined mica pigments and blends thereof, other conventional pigments to impart color or extender pigments. Representative such pigments may include, for example, titanium dioxide, carbon black, graphite, ceramic black, lamp black, antimony sulfide, black iron oxide, aluminum pastes, yellow iron oxide, red iron oxide, iron blue, phthalo blue and green, nickel titanate, dianisidine orange, dinitroaniline orange, imidazole orange, quinacridone red, violet and magenta, toluidine red, molybdate orange, and the like. Extender pigments, such as amorphous, diatomaceous, fumed, quartz and crystalline silica, clays, aluminum silicates, magnesium aluminum silicates, talc, mica, delaminated clays, calcium carbonates and silicates, gypsum, barium sulfate, calcium zinc molybdates, zinc oxide, phosphosilicates and borosilicates of calcium, barium and strontium, barium metaborate monohydrate, and the like can also be incorporated.

A useful feature of the coating compositions of the present invention is that they provide in a single coating a dry film having good adhesion to plastic substrates, improved chemical resistance and a soft feel. The coating composition herein may be applied by any conventional means to a portion or all of a plastic substrate. The compositions may be applied by spray apparatus, roller, brush, or dipping. One or more layers may be applied to the substrate wet on wet or wet on dry to a total dry film thickness of between 1 mil and 10 mils, although dry films in the range of 1 mil to 5 mils are desirable in some applications, and in others, from 1 mil to 3 mils.

As described above, there are a wide variety of plastic substrates and articles of manufacture having plastic substrates to which the presently described compositions are well suited. In a particularly useful application of the coatings of the present invention, the substrate may be a portion of the interior component of a vehicle, such as a dashboard, steering wheel, knob, console or the like. Alternatively, the substrate may be a portion of a consumer or household product, such as a computer, electronic gaming or music storage and playback device.

While the present invention is directed to improving chemical resistance in soft-feel coatings applied to plastic substrates, it will be noted that the coatings may be employed on other substrate materials made of metal, wood, glass, ceramic, and the like.

EXAMPLES

The invention is described further by the following example, which is intended to be illustrative and by no means limiting. Except for Example formulas 12-14, all formulations are in weight percent with respect to total formulation. Examples 12-14 are based on weight.

An evaluation of aluminum and stainless steel pigments in soft feel coatings was conducted on the basis of the solvent-borne formulations described below, as compared to each other and against flatted and unflattened control compositions.

| | EX. 1 | EX. 2 | EX. 3 | EX. 4 | EX. 5 | EX. 6 | EX. 7 |
|---|---|---|---|---|---|---|---|
| Material | CONTROL high gloss | CONTROL low gloss | 12.5% vol. Al. | 20% vol. Al. | 20% vol. Al. low gloss | 12.5% vol. SS | 12.5% vol. SS low gloss |
| Resin A | 18.60 | 16.11 | 15.31 | 14.04 | 12.70 | 12.47 | 11.45 |
| Resin B | 13.95 | 13.42 | 12.76 | 11.70 | 10.58 | 10.39 | 9.55 |
| Solvent A | 15.50 | 16.11 | 15.31 | 15.21 | 15.87 | 16.62 | 17.18 |
| Solvent B | 15.50 | 16.11 | 15.31 | 15.21 | 15.87 | 16.62 | 17.18 |
| Catalyst A | 1.72 | 1.48 | 1.42 | 1.30 | 1.17 | 1.15 | 1.06 |
| Flow Additive | 0.37 | 0.32 | 0.31 | 0.28 | 0.25 | 0.25 | 0.23 |
| UV stabilizer | 0.78 | 0.67 | 0.64 | 0.58 | 0.53 | 0.52 | 0.48 |
| flattener | | 4.03 | | | 3.17 | | 2.39 |
| 15 μm aluminum sand dollar | | | 8.76 | 12.85 | 11.63 | | |
| 15 μm stainless steel flake | | | | | | 13.25 | 12.17 |
| Solvent D | 15.50 | 16.11 | 15.31 | 15.21 | 15.87 | 16.62 | 17.18 |
| HDI isocyanate A | 18.07 | 15.65 | 14.88 | 13.64 | 12.34 | 12.11 | 11.13 |
| NCO/OH | 1.1 | 1.1 | 1.1 | 1.1 | 1.1 | 1.1 | 1.1 |

Samples were mixed 5 minutes on med-high speed after the addition of the pigments. Formulas were sprayed at a 2 mil film build using a HVLP gravity feed gun 4 mm gun tip, 50 psi at wall, 29 psi at gun, fan closed ¼ turn; fluid open all the way, 2 coats, 20 sec flash between coats, 10 min RT flash 30 min@180° F. then placed in control temp and humidity room 3-5 days. Substrate: ABS plastic half smooth half grained panel.

An evaluation of natural mica, calcined mica and fluorophlogopite pigments in solvent-borne and water-borne soft feel coatings was conducted on the basis of the formulations described below. Samples were prepared as described above.

|  | EX. 8 | EX. 9 | EX. 10 | EX. 11 | EX. 12 | EX. 13 | EX. 14 |
|---|---|---|---|---|---|---|---|
| Material | 12.5% natural mica low gloss | 12.5% calcined mica low gloss | 8% FPGP 30 μm low gloss | 12.5% f FPGP 5 μm low gloss | CONTROL WB low gloss | 12.5% calcined mica low gloss | 12.5% FPGP low gloss |
| 5μ Resin A | 13.26 | 13.26 | 13.65 | 13.19 |  |  |  |
| Resin B | 11.05 | 11.05 | 11.37 | 10.99 |  |  |  |
| Resin C |  |  |  |  | 72.80 | 72.80 | 72.80 |
| Solvent A | 16.57 | 16.57 | 17.06 | 16.48 |  |  |  |
| Solvent B | 16.57 | 16.57 | 17.06 | 16.48 |  |  |  |
| Solvent C |  |  |  |  | 10.00 | 10.00 | 10.00 |
| Catalyst A | 1.23 | 1.23 | 1.26 | 1.22 | 0.12 | 0.12 | 0.12 |
| Flow Additive | 0.27 | 0.27 | 0.27 | 0.26 |  |  |  |
| UV stabilizer | 0.55 | 0.55 | 0.57 | 0.55 |  |  |  |
| Surfactant |  |  |  |  | 2.30 | 2.30 | 2.30 |
| Defoamer |  |  |  |  | 0.60 | 0.60 | 0.60 |
| flattener | 1.66 | 1.66 | 2.27 | 2.20 | 3.80 | 2.50 | 3.00 |
| 17 μm mica platelet | 9.38 |  |  |  |  |  |  |
| 20 μm calcined mica platelet |  | 9.38 |  |  |  | 13.00 |  |
| 30 μm synthetic fluorophlogopite |  |  | 6.17 |  |  |  | 13.00 |
| <15 μm synthetic fluorophlogopite |  |  |  | 9.33 |  |  |  |
| Solvent D | 16.57 | 16.57 | 17.06 | 16.48 |  |  |  |
| Solvent E |  |  |  |  | 3.48 | 3.48 | 3.48 |
| HDI isocyanate A | 12.88 | 12.88 | 13.26 | 12.81 |  |  |  |
| HDI isocyanate B |  |  |  |  | 10.40 | 10.40 | 10.40 |
| NCO/OH | 1.1 | 1.1 | 1.1 | 1.1 | 1.5 | 1.5 | 1.5 |

For purposes of the Examples above:

| Material | Description | |
|---|---|---|
| Resin A | blend of 3 polyester polyols | |
| Resin B | low Tg soft resin | Desmophen 1652 available from Bayer |
| Resin C | waterborne soft polyester resin | Proprietary resin |
| Solvent A | slow solvent | EEP |
| Solvent B | medium solvent | MAK |
| Solvent C | water | |
| Catalyst A | tin catalyst | DBTDL solution |
| Flow Additive | silicone flow additive | Baysilone OL 17 available from Lanxess Corp. |
| UV stabilizer | | Tinuvin 292 available from Air Products |
| Surfactant | | Surfynol 502 available from Air Products |
| Defoamer | | Byk 011 available from BYK Chemie |
| Flattener | silica flattener | Acematt 3300 available from Degussa |
| 15 μm aluminum sand dollar | | SSP 554 available from Silberline |
| 15 μm stainless steel flake | | StaySteel 15 available from Eckart |
| 17 μm mica platelet | | Micro-Mica C4000 available from Imyres |
| 20 μm calcined mica platelet | | Calcined Mica A available from EMD |
| 30 μm synthetic fluorophlogopite | | SM10-60 available from Kuncai |
| <15 μm synthetic fluorophlogopite | | SM0-15 available from Kuncai |
| Solvent D | fast solvent | MPK |
| Solvent E | medium solvent | PMA |
| Isocyanate A | HDI isocyanate | Desmodur N 3300 available from Bayer |
| Isocyanate B | HDI isocyanate | Bayhydur 30 available from Bayer |

Results

Panels were measured for gloss at 60° using a gloss meter. For low gloss applications, a gloss measure of less than 5° is particularly desirable. The panels were ranked for feel by grip, slip, and softness. Chemical resistance was testing using GMW14445 test for sunscreen and bug repellant resistance. For purposes of these evaluations, useful grip ratings were SM-M, slip ratings of SM-M, softness ratings of 7 to 10, and SB test results of 2.0 or lower on both smooth and grained portions of the panel.

| Feel Rankings: grip/slip | Feel Rankings 1-10 |
|---|---|
| VH—very high | 1—hardcoat |
| H—high | 2—hardcoat with some flexibility |
| MH—moderate high | 3—slight indication of soft feel |
| M—moderate | 4—some softness |
| SM—slight to moderate | 5—semisoft |
| S—slight | 6—semisoft-soft |

-continued

| Feel Rankings: | |
|---|---|
| grip/slip | Feel Rankings 1-10 |
| VS—very slight | 7—soft coat GM standard |
| VVS—very very slight | 8—softer than GM standard |
| Tr.—trace | 9—very soft |
| N—none | 10—very soft and compressible |

| GMW14445 Sun and Bug Test Ratings (SB test) |
|---|
| 4.0+ solution dissolved through substrate |
| 3.6-4.0 moderate to severe wrinkling and blistering of film |
| 3.2-3.5 slight to moderate wrinkling and blistering of film |
| 3.1 first sign of wrinkling |
| 3.0 first sign of blistering |
| 2.5-2.9 moderate-severe swelling/staining |
| 2.1-2.4 slight-moderate swelling, moderate staining |
| 2.0-passing; no swelling, some staining |
| 1.5-1.9 no swelling, slight staining |
| 1.0-1.4 very slight staining |
| 0.1-0.9 trace evidence of staining |
| 0 no evidence of staining |

Examples 1-7

|  | EX. 1 | EX. 2 | EX. 3 | EX. 4 | EX. 5 | EX. 6 | EX. 7 |
|---|---|---|---|---|---|---|---|
| Gloss 60° | 80.9 | 2.0 | 56.7 | 39.1 | 2.5 | 8.9 | 2.3 |
| Feel grip | VH | SM-M | H | MH-H | VS | MH | SM-M |
| Feel slip | Tr. | M | VS | VS-S | MH | S | M |
| Softness 1-10 | 10 | 8 | 7 | 5.5 | 4 | 9 | 8 |
| GMW14445 test for sun/bug (SB) chemical resistance (smooth/grained) | 4.0/4.0 | 4.0/4.0 | 2.5/3.0 | 2.0/2.0 | 3.8/4.0 | 2.0/2.0 | 2.0/2.0 |
| SB failure mode | Wrinkling | Wrinkling | Blistering | Pass | Wrinkling | Pass | Pass |
| Cross section analysis for barrier alignment | NA | NA | horizontal | horizontal | random | horizontal | horizontal |

Examples 8-14

|  | EX. 8 | EX. 9 | EX. 10 | EX. 11 | EX. 12 | EX. 13 | EX. 14 |
|---|---|---|---|---|---|---|---|
| Gloss 60° | 1.6 | 2.0 | 2.0 | 2.0 | 2.1 | 3.1 | 1.8 |
| feel grip | SM | SM | SM-M | SM-M | M | SM-M | SM-M |
| feel slip | M | M | M | M | M | M | M |
| softness 1-10 | 7 | 7 | 7.5 | 7.5 | 8 | 7 | 7 |
| GMW14445 test for sun/bug (SB) chemical resistance (smooth/grained) | 3.5/4.0 | 1.5/1.5 | 1.5/1.5 | 1.5/1.5 | 4.0/4.0 | 2.0/3.0 | 2.0/2.0 |
| SB failure mode | Swelling/wrinkling | pass | pass | pass | wrinkling | travel in grain | pass |
| cross section analysis for barrier alignment | horizontal | horizontal | horizontal | horizontal | NA | horizontal | horizontal |

Analysis

Although aluminum pigments work as a chemical barrier as shown in example 4, the feel was negatively impacted. Cross section analysis indicates that the pigment dispersed throughout the entire film. In example 5, cross section analysis indicated the aluminum particles become unaligned in the presence of flattener. This system failed chemical resistance tests much like the control examples 1 and 2. The added flattener and aluminum greatly reduce the feel of the film. The high density of stainless steel, it is believed, enabled the particles to align horizontally in a condensed layer in the film near the substrate and away from the surface. Less of the stainless steel pigment was needed to pass chemical resistance testing and cross section analysis indicated no harmful interaction with the stainless steel pigment and the flattener pigment, and feel is retained at the surface of the film.

Fluorophlogopite demonstrates success at levels as low at 8% volume solids in soft feel coatings. Examples 10 and 11 illustrate some role of particle size. The volume solids were higher in the smaller synthetic fluorophlogopite (example 11), but chemical resistance was better in the larger particles size in example 10.

The waterborne examples demonstrate the versatility of the invention taught herein to improve chemical resistance.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A soft feel coating composition comprising:
   a) a film forming resin matrix composition which cures to form a soft feel film having a resin matrix Tg of −80° C. to −20° C.;
   b) at least one solvent; and c) a stainless steel platelet shaped pigment having a density 50% to 400% greater than the density of the resin matrix composition, wherein the stainless steel platelet shaped pigment has a flattened profile that imparts chemical resistance to the coating composition.

2. The coating composition of claim 1, wherein the stainless steel platelet shaped pigment has a density 150% to 400% greater than the density of the resin matrix composition.

3. The coating composition of claim 1, wherein the stainless steel platelet shaped pigment is 5% to about 25% volume solids with respect to the total composition.

4. The coating composition of claim 3, wherein the stainless steel platelet shaped pigment is 5% to about 10% volume solids with respect to the total composition.

5. The coating composition of claim 3, wherein the stainless steel platelet shaped pigment is about 10% to about 15% volume solids with respect to the total composition.

6. The coating composition of claim 3, further comprising a flattening agent.

7. The coating composition of claim 6, wherein the flattening agent is about 2 to about 5 weight percent based on the total weight of solids in the coating composition.

* * * * *